United States Patent [19]
Gorski

[11] Patent Number: 4,948,410
[45] Date of Patent: Aug. 14, 1990

[54] CHECK VALVE ASSEMBLY FOR GLASS FORMING MACHINERY

[75] Inventor: Richard A. Gorski, W. Suffield, Conn.

[73] Assignee: Emhart Industries, Inc., Towson, Md.

[21] Appl. No.: 419,223

[22] Filed: Oct. 10, 1989

[51] Int. Cl.⁵ .............................................. C03B 9/14
[52] U.S. Cl. ....................................... 65/261; 65/300; 65/318
[58] Field of Search ................. 65/261, 300, 318, 223, 65/301, 304

[56] References Cited

U.S. PATENT DOCUMENTS

| | | | |
|---|---|---|---|
| 3,953,187 | 4/1976 | James | 65/318 X |
| 4,444,578 | 4/1984 | Marroquin | 65/300 X |
| 4,509,969 | 4/1985 | Abbott | 65/300 |
| 4,678,494 | 7/1987 | Nebelung et al. | 65/261 |
| 4,889,549 | 12/1989 | Trahan et al. | 65/318 X |

Primary Examiner—Robert L. Lindsay
Attorney, Agent, or Firm—Spencer T. Smith

[57] ABSTRACT

A check valve assembly which is to permit flow into a pneumatic cylinder is accessible without taking the cylinder apart. The check valve is located within an insert which is secured to the cylinder head at an exterior surface. Removal of the inserts makes the check valve accessible.

2 Claims, 1 Drawing Sheet

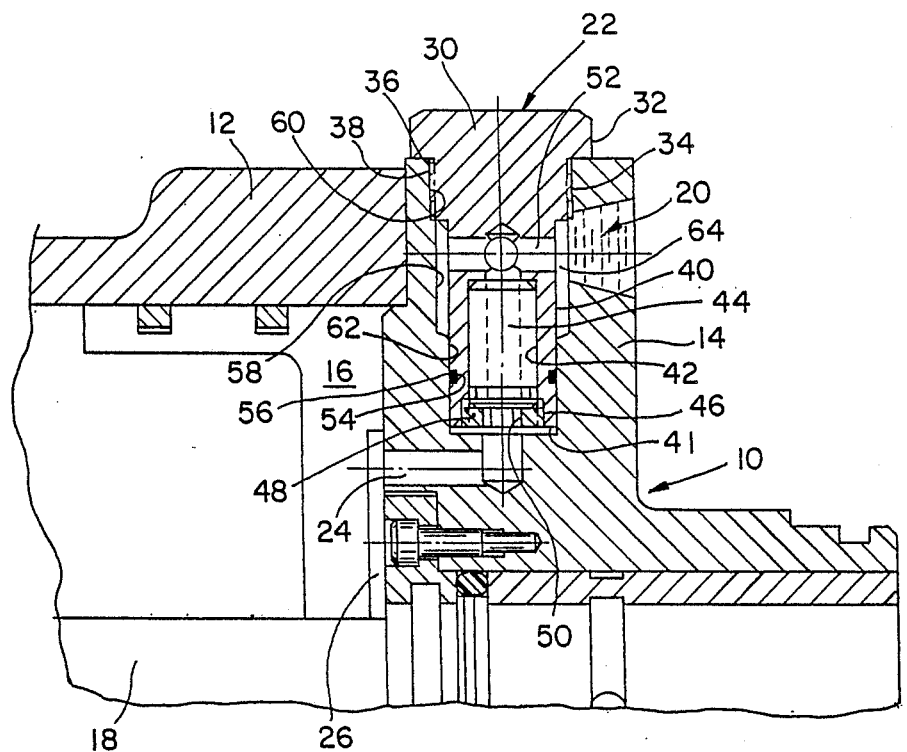

CHECK VALVE ASSEMBLY FOR GLASS FORMING MACHINERY

The present invention relates to individual section glassware forming machines which are utilized to make containers such as bottles and the like.

In this machinery, system elements are pneumatically displaced and provision has to be made to locate check valves in some of the air lines to restrict air flow to a single direction. When this air flow direction is into the mechanism, the check valve is conventionally located in a bore defined in an interior surface of the mechanism. This makes replacement extremely difficult since the mechanism must be taken apart in a very hot and unpleasant environment to gain access to the check valve.

It is accordingly an object of the present invention to provide an improved check valve assembly for glass forming machinery which will make check valve replacement quick and easy.

Additional objectives and advantages of the present invention will become apparent from the following portion of this specification and from the accompanying drawings which illustrate in accordance with the mandate of the patent statutes a presently preferred embodiment incorporating the principles of the invention.

Referring to the drawings:

The sole FIGURE is a cross sectional valuational view of a portion of an individual section of an individual section glass container forming machine made in accordance with the teachings of the present invention.

An individual section receives a gob of molten glass, forms the gob into a parison in a blank mold, transfers the parison to a finish mold and then blows the parison into a container. Each mold has a plurality of parts which are displaced to and from a mold forming location by a pneumatic cylinder 10 having a cylindrical housing 12 and a head 14. A piston 16 is slidably displaceable axially along the cylindrical housing 12 and the integral rod 18 is connected to the movable mold parts (not shown) to effect the desired displacement of the molds.

To displace the piston to the right, operating air is directed through an inlet air conduit 20 through a check valve assembly 22 and into an inlet port 24 communicating with the volume 26 defined between the piston 16 and the cylinder housing 12 and end cap 14.

The check valve assembly 22 includes an insert 30 which has a large hex head 32, a threaded section 34 axially separated from the head by an annular groove 36 which receives an O-ring 38 and a reduced diameter cylindrical portion 40 which extends from the threaded section 34 to the end of the insert. Extending axially from the end 41 of the insert is a bore 42 which receives a check valve 44. The outer end of the bore is threaded 46 to receive a retaining screw 48 which has an axial thru hole 50. The inner end of the check valve bore communicates with a pair of diametral thru-bores 52 and an annular groove 54 in the cylindrical wall receives an O-ring 56.

The insert receiving bore 58 in the head has a threaded opening portion 60 to threadedly receive the threaded insert section 34 and has a reduced diameter bottom cylindrical portion 62 which slidingly receives the bottom of the cylindrical insert portion 40 (the O-ring 56 seals these surfaces). The portion of the insert receiving bore 58 between the threaded bore portion 60 and the reduced diameter portion 62 is spaced from the insert and thereby defines a manifold 64 connecting the operating air inlet 20 with the insert thru diametral bores 52 so that air can pass through the check valve and into the cylinder and not vice versa.

To remove and replace a faulty check valve the insert is screwed out of the insert receiving bore and replaced with a new check valve assembly. The faulty check valve assembly can then be repaired remote from the I.S. machine by unscrewing the retaining screw 44 exposing the faulty check valve.

I claim:

1. A machine for forming a gob of molten glass into a glass container comprising
    a pneumatic cylinder including a cylindrical housing and a head closing one end of said cylindrical housing,
    an operating air line for directing air through said head into said cylindrical housing including an inlet conduit communicating with the exterior surface of said head and an inlet port communicating with the interior surface of said head, and
    a check valve assembly for connecting said inlet conduit to said inlet port including
        an insert having a head portion at one end, a threaded section adjacent to said head portion and a reduced diameter cylindrical portion at the other end,
        a check valve bore extending axially into said cylindrical end portion,
        a check valve in said check valve bore,
        means for securing said check valve in said bore, said securing means having an axially extending bore there through,
        insert conduit means extending from said check valve bore to the exterior surface of said reduced diameter cylindrical portion,
        an insert receiving bore in said head having a threaded portion for threadedly receiving said insert, said insert receiving bore being selectively sized to define with a portion of said reduced diameter cylindrical portion proximate the location where said insert conduit means communicate with said exterior insert surface a manifold for connecting said inlet conduit and said check valve conduit means, said insert receiving bore being selectively configured to slidingly receive said end portion of said insert.

2. A machine according to claim 1 further comprising means for defining a fluid seal between the surface of said insert receiving bore and said insert end portion.

* * * * *